(12) United States Patent
Petridis et al.

(10) Patent No.: US 8,983,721 B2
(45) Date of Patent: Mar. 17, 2015

(54) METHOD OF CONTROLLING THE OPERATION OF A REAR WIPER SYSTEM OF A MOTOR VEHICLE

(71) Applicant: Ford Global Technologies, LLC, Dearborn, MI (US)

(72) Inventors: Themi Philemon Petridis, Bishop's Stortford (GB); Nils Schloesser, Nordrhein Westfalen (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 13/922,749

(22) Filed: Jun. 20, 2013

(65) Prior Publication Data
US 2013/0345931 A1    Dec. 26, 2013

(30) Foreign Application Priority Data
Jun. 21, 2012  (GB) .................................. 1211016.9

(51) Int. Cl.
*B60S 1/08* (2006.01)
*B60S 1/58* (2006.01)

(52) U.S. Cl.
CPC .................. *B60S 1/0822* (2013.01); *B60S 1/08* (2013.01); *B60S 1/0855* (2013.01); *B60S 1/583* (2013.01)
USPC .............................. 701/36; 701/1; 15/250.04

(58) Field of Classification Search
USPC .......... 701/36, 1; 15/250.12, 250.34; 348/148
See application file for complete search history.

(56) References Cited

U.S. PATENT DOCUMENTS

| 4,999,550 A | 3/1991 | Jones |
| 5,086,260 A | 2/1992 | Ito |
| 7,506,402 B2 * | 3/2009 | Laurens et al. ............ 15/250.34 |
| 2002/0074959 A1 | 6/2002 | Van Wiemeersch |
| 2010/0045012 A1 | 2/2010 | Lungershausen et al. |
| 2014/0049648 A1 * | 2/2014 | Stein et al. .................... 348/148 |

FOREIGN PATENT DOCUMENTS

| DE | 10054220 A1 | 8/2001 |
| EP | 1780360 A1 | 5/2007 |
| GB | 2478416 A | 9/2011 |

OTHER PUBLICATIONS

European Patent Office, Search Report for the corresponding GB Patent Application No. GB 1211016.9 mailed Sep. 28, 2012.
European Patent Office, Search Report for the corresponding European Patent Application No. GB1310934.3 mailed Dec. 12, 2013.

* cited by examiner

*Primary Examiner* — Tan Q Nguyen
(74) *Attorney, Agent, or Firm* — Frank A. MacKenzie; Brooks Kushman P.C.

(57) ABSTRACT

A method and system for detecting the presence of a carrier mounted on the rear of a motor vehicle or of an object carried by the carrier that may cause damage or a malfunction of a rear wiper system of the motor vehicle. If a potentially obstructing situation is determined to be present, the rear wiper system is deactivated to prevent it malfunctioning or being damaged by the obstruction. A user of the vehicle may be provided with a message that an obstruction has been detected and the user may control whether the wiper system is deactivated. The obstruction may be sensed by monitoring the amount of current drawn by a wiper motor, by an ultrasonic sensor, or by a rear-view camera.

10 Claims, 3 Drawing Sheets

METHOD OF CONTROLLING THE OPERATION OF A REAR WIPER SYSTEM OF A MOTOR VEHICLE

CROSS-REFERENCE TO RELATED APPLICATIONS

This application claims foreign priority benefits under 35 U.S.C. §119(a)-(d) to GB 1211016.9 filed Jun. 21, 2012, which is hereby incorporated by reference in its entirety.

TECHNICAL FIELD

This invention relates to a motor vehicle and in particular to a method for reducing the risk of damage to or malfunction of a rear wiper system of the motor vehicle.

BACKGROUND

It is known from for a motor vehicle to have a rear window formed as part of a rear closure sometimes referred to as a rear hatch or tailgate and a wiper system for the rear window including a wiper arm that traverse across the rear screen to clear water and debris therefrom.

It is further known to provide a rack or carrier for carrying an object such as a bicycle on a rear part of a motor vehicle. With such a carrier it is common for supports forming part of the carrier to rest against a rear screen of the vehicle.

The supports for the carrier may obstruct the motion of a wiper arm associated with the rear screen. Such an obstruction to motion of the wiper arm may result in damage to a wiper motor for the rear wiper or a drive mechanism for the rear wiper can occur. This is particularly so if the motor vehicle includes means to automatically switch on the rear wiper when reverse gear is selected and/or when the wiper for a front windshield is switched on.

SUMMARY

According to a first aspect of the invention there is provided, a method of controlling the operation of a rear wiper system of a motor vehicle having a carrier mountable on a rear end thereof for transporting an object, the rear wiper system comprising a wiper arm to clear water and debris from a rear screen of the motor vehicle and a motor to move the wiper arm wherein the method comprises detecting whether at least one of the carrier and the object is in a position that obstructs motion of the wiper arm and, if at least one of the carrier and the object is detected as being in an obstructing position, deactivating the rear wiper system of the motor vehicle.

Deactivating the rear wiper system may comprise returning the wiper arm to a park position.

Alternatively, deactivating the rear wiper system may comprise maintaining the wiper arm in a park position.

Deactivating the rear wiper system may include deactivating the motor of the rear wiper system.

Detecting whether at least one of the carrier and the object obstructs motion of the wiper arm may comprise using at least one of an ultrasonic sensor and a rear view camera to detect whether at least one of the carrier and the object is in an obstructing position.

Alternatively, detecting whether at least one of the carrier and the object is in an obstructing position on the motor vehicle may comprise monitoring the current draw of the motor and, if the current draw exceeds a predefined limit, using this as an indication that one of the carrier and the object is in an obstructing position.

According to a second aspect of the invention there is provided a motor vehicle having a carrier mounted on a rear end thereof for transporting an object, a rear wiper system having a wiper arm and a motor to move the wiper arm and a detection system for detecting whether at least one of the carrier and the object is in a wiper arm obstructing position wherein the detection system is operable to deactivate the rear wiper system if at least one of the carrier and the object is sensed by the detection system to be in a wiper arm obstructing position.

The detection system may comprise an electronic controller and a sensor operably connected to the electronic controller wherein, if a signal from the sensor indicates that at least one of the carrier and the object is in an obstructing position, the electronic controller may be operable to deactivate the rear wiper system.

The at least one sensor for detecting the presence of at least one of the carrier and the object may comprise at least one of an ultrasonic sensor and a rear view camera.

The at least one sensor may be a current monitoring system for monitoring the current draw of the motor and, if the current draw exceeds a predefined limit, this may be used as an indication that motion of the wiper arm is being obstructed.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
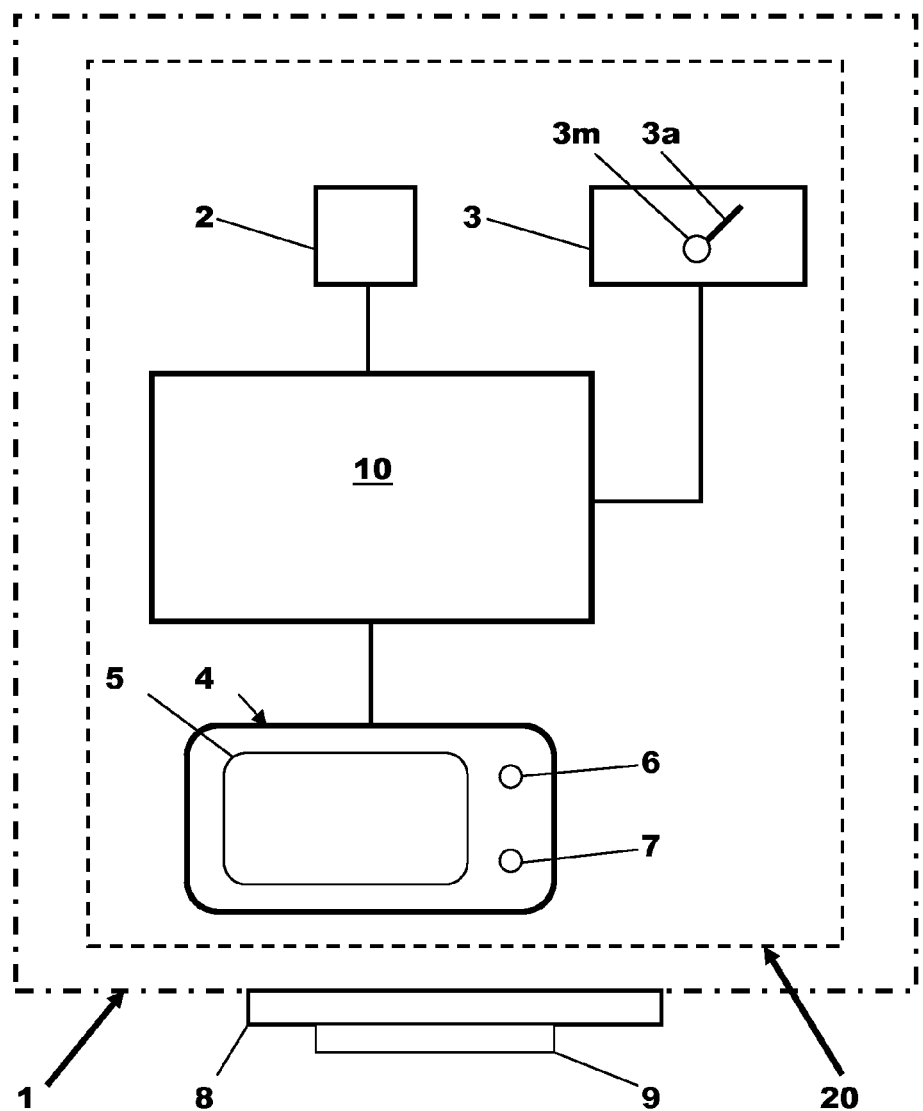
FIG. 1 is a schematic diagram of a motor vehicle according to a second aspect of the invention.

With reference to FIG. 1 there is shown a motor vehicle 1 having a carrier 8 mounted on a rear end thereof for carrying an object 9 such as a bicycle and a detection system 20.

The detection system 20 comprises an electronic controller 10, a sensor 2 operably connected to the electronic controller 10 and a human machine interface (HMI) 4 including a display screen 5 and operator input means 6, 7. The electronic controller 10 is operable to deactivate a rear wiper system 3 in response to the signal or signals received from the sensor 2.

If the signal or signals from the sensor 2 indicate that at least one of the carrier 8 and the object 9 is present, the electronic controller 10 is operable to deactivate the rear wiper system 3 of the motor vehicle 1 to which it is operably connected.

In some embodiments the deactivation of the rear wiper system 3 may not occur automatically but only in response to a confirmation that deactivation is required. In such a case a message may be displayed on the screen 5 such as "Obstruction Detected. Do you wish to switch off rear wiper"?

If the answer is 'Yes' then a user of the motor vehicle 1 would touch/press input 6 and if the answer is 'No' then the user would touch/press the input 7. It will be appreciated the inputs 6 and 7 could be buttons, switches, be formed as part of a touch screen device or be integrated into the steering column stalk controls.

With particular reference to FIG. 1 the motor vehicle 1 has a rear screen (not shown) and the rear wiper system 3 including a wiper arm 3a to clear water and debris from the rear screen and a motor 3m to move the wiper arm 3a.

The carrier 8 includes at least one support member (not shown) that rests upon the rear screen in a position that obstructs motion of the wiper arm 3a. The system deactivated by the electronic controller 10 is the rear wiper system 3 and in particular the motor 3m of the rear wiper system 3.

In one embodiment the rear wiper system 3 is deactivated by using the motor 3m to return the wiper arm 3a to a park position and then maintaining it in the park position for at least the current vehicle operating cycle by switching off the motor 3m. In this case the sensing means 2 may be a current monitoring system associated with the motor 3m for monitoring the current draw of the motor 3m. If the current draw exceeds a predefined limit this is used as an indication that the carrier 8 or the bicycle 9 is obstructing the motion of the wiper arm 3a. The motor 3m is then reversed until it reaches a park position at which time it is switched off for the current operating cycle. It will be appreciated that in such an embodiment the sensor 2 is formed as part of the wiper system 3 and so box 2 on FIG. 1 would be contained within box 3 on FIG. 1.

It will however be appreciated that instead of measuring current draw of the motor 3m other sensors such as an ultrasonic sensor or a rear view camera could be used to directly sense the presence of an obstruction to wiper arm movement and in such a case the sensor 2 and the rear wiper system 3 would be a separate entities as indicated by the boxes 2 and 3 on FIG. 1.

In such a case, the rear wiper system 3 could be deactivated before the wiper arm 3a moves from the park position when an obstruction is detected. That is to say, the wiper arm 3a is maintained in the park position.

As referred to above, a user of the motor vehicle 1 could be given an opportunity via the HMI 4 to allow or prevent deactivation.

Figure 2:
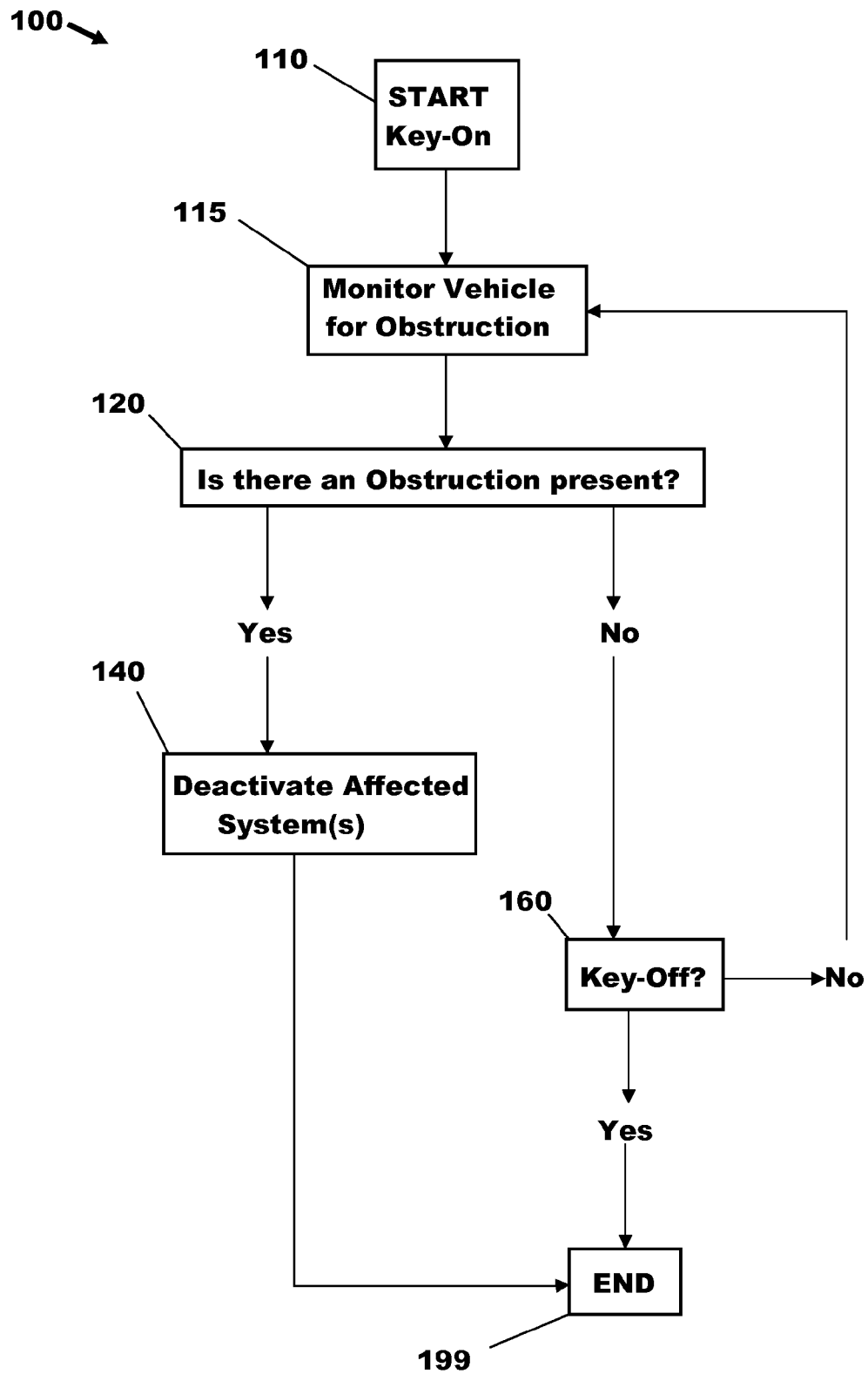
FIG. 2 is a flow chart of a first embodiment of a method according to a first aspect of the invention.

Referring now to FIG. 2 there is shown a first embodiment of a method 100 according to the first aspect of the invention.

The method commences at box 110 which is a 'key-on' event for the motor vehicle 1. The method then advances to box 115 in which monitoring of the motor vehicle 1 for obstructions such as a fitted carrier 8 or an object 9 being transported by the carrier 8 is performed. As previously referred to this monitoring can be carried out by measuring the current demand of a drive motor in the case of a rear wiper system and/or by the use of other sensors such as ultrasonic sensors or a rear view camera. Examples of such sensors are given, for example, in the German patent publication 102008027970; US patent publication 2006103727 and Canadian Patent publication 2684783.

Based upon the result of the monitoring step in box 115 a determination is made in box 120 as to whether an obstruction is present. That is to say, if the sensor 2 indicates an obstruction to motion of the wiper arm 3a is present then the output from box 120 will be 'Yes' and if no obstruction to motion of the wiper arm 3a is detected then the output from box 120 will be 'No'.

Dealing firstly with a 'No' output from box 120 the method then advances to box 160 where it is checked whether a 'key-off' event has occurred. If a 'key-off' event is determined to have occurred then the method ends in box 199 otherwise the method returns to box 115 to continue monitoring for obstructions.

If the output from box 120 is 'Yes' then the method advances to box 140 where the affected system namely the rear wiper system 3 is deactivated.

The method then advances to box 199 where the method ends.

Figure 3:
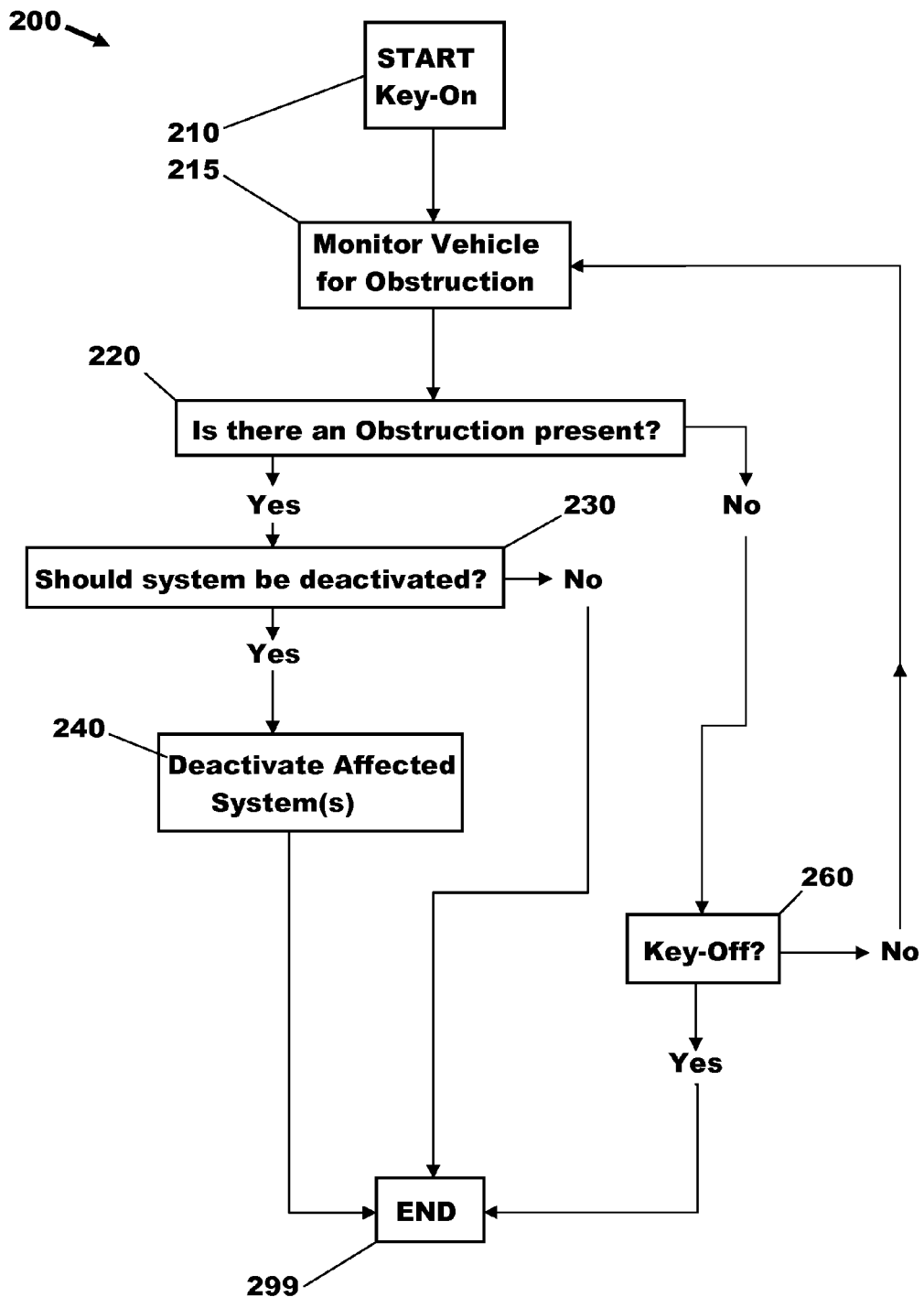
FIG. 3 is a flow chart of a second embodiment of a method according to the first aspect of the invention.

Referring now to FIG. 3 there is shown a second embodiment of a method 200 according to the invention.

The method commences at box 210 which is a 'key-on' event for the motor vehicle 1. The method then advances to box 215 in which monitoring of the motor vehicle 1 for obstructions such as a fitted carrier 8 or an object 9 being carried by the carrier 8 is performed. As previously referred to, the monitoring can be carried out by measuring the current demand of a drive motor in the case of a rear wiper system and/or by the use of sensors such as ultrasonic sensors or a rear view camera.

Based upon the result of the monitoring step in box 215 a determination is made in box 220 as to whether an obstruction is present. That is to say, if the sensor 2 indicates that an obstruction to motion of the wiper arm 3a is present then the output from box 220 will be 'Yes' and if no obstruction to motion of the wiper arm 3a is detected then the output from box 220 will be 'No'.

Dealing firstly with a 'No' output from box 220, the method then advances to box 260 where it is checked whether a 'key-off' event has occurred. If a 'key-off' event is determined to have occurred then the method ends in box 299 otherwise the method returns to box 215 to continue monitoring for obstructions.

If the output from box 220 is 'Yes' then the method advances to box 230. In box 230 it is determined whether a potentially affected system should be deactivated. This is achieved by sending a message to a user of the motor vehicle via the HMI 4 and acting upon the response of the user.

If the user responds that 'Yes' the affected system or systems should be deactivated then the method advances to box 240 where the affected system namely the rear wiper system 3 is deactivated.

The method then advances from box 240 to box 299 where it ends. That is to say, once a user has decided to deactivate the rear wiper system 3 it remains deactivated for the current 'key-on' cycle.

Referring back to box 230 if the output is 'No' then the method advances from box 230 to box 299 where it ends. That is to say, once a user has decided not to deactivate the rear wiper system 3 it remains active for the current 'key-on' cycle.

Although in the embodiment shown in FIG. 3 once the system is deactivated it remains deactivated for the current key cycle, this need not be the case. For example after a deactivation decision in box 240 there could be a time delay of a few minutes such as ten minutes after which the method advances to box 260 and, provided there is not a 'key-off' event proceeds from box 260 back to box 215 to recheck whether the obstruction is still present and then proceeds from box 215 as previously described. To avoid annoying a user such as a driver of the motor vehicle 1, the method could then also include a step in which, if the driver has already agreed to deactivate the rear wiper system 3 more than a predefined number of times, the method will end and the rear wiper system 3 will then remain deactivated for the rest of the current key cycle.

As yet a further alternative a system deactivated may remain deactivated beyond the current key cycle so that upon starting a new key cycle it will initially be deactivated until it is confirmed that either there is no longer an obstruction present or until the driver has instructed the system the be activated.

It will be appreciated that although the invention has been described with respect to a system in which deactivation includes switching of the motor used to move the wiper arm, the rear wiper system could also be deactivated by interrupting a control flow path between a user operable switch or automatic control device such as a rain sensor or a linkage to a front windshield wiper control and the rear wiper system so that the rear wiper system is unresponsive to a wiper activation command from the switch or the control device.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling operation of a wiper system for a rear screen of a motor vehicle, the wiper system comprising a wiper arm and a motor to move the wiper arm, the method comprising:
    operating a rear-view camera to detect an object carrier mounted to the vehicle in a position expected to obstruct motion of the wiper arm; and
    deactivating the wiper system if the object carrier is mounted to the vehicle.

2. The method of claim 1 wherein deactivating the wiper system comprises maintaining the wiper arm in a park position.

3. The method of claim 1 wherein the detecting step comprises detecting that a portion of the object carrier is resting upon the rear screen in an obstructing position.

4. The method of claim 1 further comprising:
    sending a message to a user of the vehicle that the obstruction was detected; and
    allowing the user to control whether the wiper system is deactivated.

5. A motor vehicle adapted to receive a carrier for transporting an object mounted on a rear end thereof adjacent to a rear screen, comprising:
    a wiper system having a wiper arm for clearing the rear screen and a motor moving the wiper arm; and
    a rear-view camera detecting whether at least one of the carrier and the object is in an obstructing position expected to obstruct movement of the wiper arm and generating a signal indicating that at least one of the carrier and the object is in the obstructing position; and
    an electronic controller operably connected with the camera to receive the signal and deactivating the wiper system in response to the signal.

6. The motor vehicle of claim 5 wherein the rear-view camera detects that a support member of the carrier is resting upon the rear screen in the obstructing position.

7. The motor vehicle of claim 5 wherein deactivating the wiper system comprises maintaining the wiper arm in a park position.

8. The motor vehicle of claim 5 further comprising a human-machine interface sending a message to a user of the motor vehicle that at least one of the carrier and the object was detected in the obstructing position and allowing the user to control whether the wiper system is deactivated.

9. A wiper system for clearing a rear screen of a motor vehicle adapted to receive a carrier for transporting an object mounted on a rear end thereof adjacent to the rear screen, comprising:
    a wiper arm movable to clear the rear screen;
    a motor moving the wiper arm;
    a rear-view camera for detecting the carrier and/or the object and generating a signal vindicating that the carrier and/or the object is in a position expected to inhibit motion of the wiper arm; and
    an electronic controller receiving the signal from the rear-view camera and operative in response thereto to prevent the motor from moving the wiper arm.

10. The wiper system of claim 9 further comprising a human-machine interface operatively associated with the rear-view camera and the electronic controller to provide a message to a user of the motor vehicle that an obstruction was detected and allowing the user to control whether the motor is to be prevented from moving the wiper arm.

* * * * *